United States Patent
Mader et al.

(10) Patent No.: US 10,657,739 B2
(45) Date of Patent: May 19, 2020

(54) VEHICLE TIRE MONITORING SYSTEMS AND METHODS

(71) Applicant: Solera Holdings, Inc., Westlake, TX (US)

(72) Inventors: Joseph Thomas Mader, Southlake, TX (US); Neal Jonathon Lowell, Roanoke, TX (US); Raymond Charles Daley, Richardson, TX (US); Sean Thomas Dodd, Tyler, TX (US); Anthony Aquila, Westlake, TX (US)

(73) Assignee: Solera Holdings, Inc., Westlake, CA (US)

( * ) Notice: Subject to any disclaimer, the term of this patent is extended or adjusted under 35 U.S.C. 154(b) by 22 days.

(21) Appl. No.: 15/725,028

(22) Filed: Oct. 4, 2017

(65) Prior Publication Data

US 2018/0096542 A1    Apr. 5, 2018

Related U.S. Application Data

(60) Provisional application No. 62/404,605, filed on Oct. 5, 2016.

(51) Int. Cl.
*G07C 5/08* (2006.01)
*B60C 23/04* (2006.01)
(Continued)

(52) U.S. Cl.
CPC .......... *G07C 5/085* (2013.01); *B60C 23/0479* (2013.01); *B60C 23/0488* (2013.01); *G06F 21/31* (2013.01); *G07C 5/008* (2013.01)

(58) Field of Classification Search
CPC .... G07C 5/085; G07C 5/008; B60C 23/0479; B60C 23/0488; G06F 21/31; B60W 2540/30
See application file for complete search history.

(56) References Cited

U.S. PATENT DOCUMENTS

| 9,240,082 B2 | 1/2016 | Marathe et al. |
| 9,663,115 B2 | 5/2017 | Singh |

(Continued)

FOREIGN PATENT DOCUMENTS

| JP | 2017110995 A | * | 6/2017 | |
| WO | WO-0160644 A1 | * | 8/2001 | ......... B60C 23/0408 |

(Continued)

OTHER PUBLICATIONS

PCT Notification of Transmittal of the International Search Report and the Written Opinion of the International Searching Authority, or the Declaration, Intl. Appl. No. PCT/US 2017/055171, dated Dec. 13, 2017.

(Continued)

*Primary Examiner* — Aaron L Troost
(74) *Attorney, Agent, or Firm* — Baker Botts L.L.P.

(57) ABSTRACT

In one embodiment, a method includes receiving on-board diagnostic (OBD) data from an OBD port of a vehicle, receiving tire pressure data from one or more tire pressure monitoring system (TPMS) sensors, and receiving accelerometer data from one or more accelerometers. The method further includes determining, based on at least some of the OBD data and at least some of the accelerometer data, recommended tires to install on the vehicle. The method further includes determining, based on at least some of the OBD data and at least some of the tire pressure data, a recommended tire pressure for at least one tire of the vehicle. The method further includes sending information to display the recommended tires to install on the vehicle and the recommended tire pressure on a display device.

17 Claims, 4 Drawing Sheets

(51) Int. Cl.
*G06F 21/31* (2013.01)
*G07C 5/00* (2006.01)

(56) References Cited

U.S. PATENT DOCUMENTS

| | | |
|---|---|---|
| 2002/0174019 A1 | 11/2002 | Henderson et al. |
| 2006/0235652 A1 | 10/2006 | Rimkus et al. |
| 2007/0156320 A1 | 7/2007 | Breed et al. |
| 2010/0211249 A1 | 8/2010 | McClellan |
| 2013/0238167 A1* | 9/2013 | Stanfield ............... G08G 1/20 701/2 |
| 2014/0052566 A1* | 2/2014 | Neidert ............ G06Q 30/0631 705/26.7 |
| 2014/0271261 A1* | 9/2014 | Boelryk ............. F04B 27/0404 417/233 |
| 2014/0366618 A1 | 12/2014 | Singh et al. |
| 2015/0005982 A1 | 1/2015 | Muthukumar |
| 2015/0046024 A1 | 2/2015 | Harbison, III |
| 2016/0121666 A1* | 5/2016 | Chan ..................... B60C 23/003 137/78.1 |
| 2016/0137206 A1 | 5/2016 | Chandraker et al. |
| 2016/0198306 A1 | 7/2016 | Miles et al. |
| 2017/0039890 A1* | 2/2017 | Truong ................ G09B 19/167 |
| 2017/0176196 A1 | 6/2017 | Powers et al. |
| 2019/0154440 A1* | 5/2019 | Theunissen ......... G01P 15/0891 |

FOREIGN PATENT DOCUMENTS

| | | |
|---|---|---|
| WO | WO 2014/186359 | 11/2014 |
| WO | WO 2016/123424 | 8/2016 |

OTHER PUBLICATIONS

EPO Communication Pursuant to Rules 161(1) and 162(EPC) regarding Ref. JL 100306P.EPP. Application No. 17787738.8-1012, dated May 14, 2019.

* cited by examiner

VEHICLE TIRE MONITORING SYSTEMS AND METHODS

CROSS-REFERENCE TO RELATED APPLICATION

This application claims the benefit of priority under 35 U.S.C. § 119(e) of U.S. Provisional Application Ser. No. 62/404,605, entitled "Vehicle Tire Monitoring System and Method," filed Oct. 5, 2016, which is incorporated herein by reference in its entirety.

TECHNICAL FIELD

This disclosure generally relates to vehicles and more specifically to vehicle tire monitoring systems and methods.

BACKGROUND

Vehicles such as automobiles rely on tires for performance and safety. However, having incorrect tires installed on a vehicle may compromise the safety and comfort of a vehicle. For example, having low-performance tires installed on a vehicle being driven by a particular driver with a sporty driving style may cause the vehicle to underperform and be uncomfortable to drive for the particular driver. Furthermore, having tires inflated to an incorrect pressure may also compromise the safety and comfort of a vehicle. For example, having under-inflated or over-inflated tires may negatively affect the maneuverability of a vehicle and may decrease the life of the tires.

SUMMARY OF PARTICULAR EMBODIMENTS

According to one embodiment, a method includes receiving on-board diagnostic (OBD) data from an OBD port of a vehicle, receiving tire pressure data from one or more tire pressure monitoring system (TPMS) sensors, and receiving accelerometer data from one or more accelerometers. The method further includes determining, based on at least some of the OBD data and at least some of the accelerometer data, recommended tires to install on the vehicle. The method further includes determining, based on at least some of the OBD data and at least some of the tire pressure data, a recommended tire pressure for at least one tire of the vehicle. The method further includes sending information to display the recommended tires to install on the vehicle and the recommended tire pressure on a display device.

Technical advantages of certain embodiments may include providing a system and method of monitoring data from multiple sources in order to provide recommendations about a vehicle's tires. Some embodiments provide tire intelligence and electronic road assessment in order to increase tire life, increase safety, increase performance of the vehicle, increase comfort, and increase fuel efficiency. Other technical advantages will be readily apparent to one skilled in the art from the following figures, descriptions, and claims. Moreover, while specific advantages have been enumerated above, various embodiments may include all, some, or none of the enumerated advantages.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION OF EXAMPLE EMBODIMENTS

Figure 1:
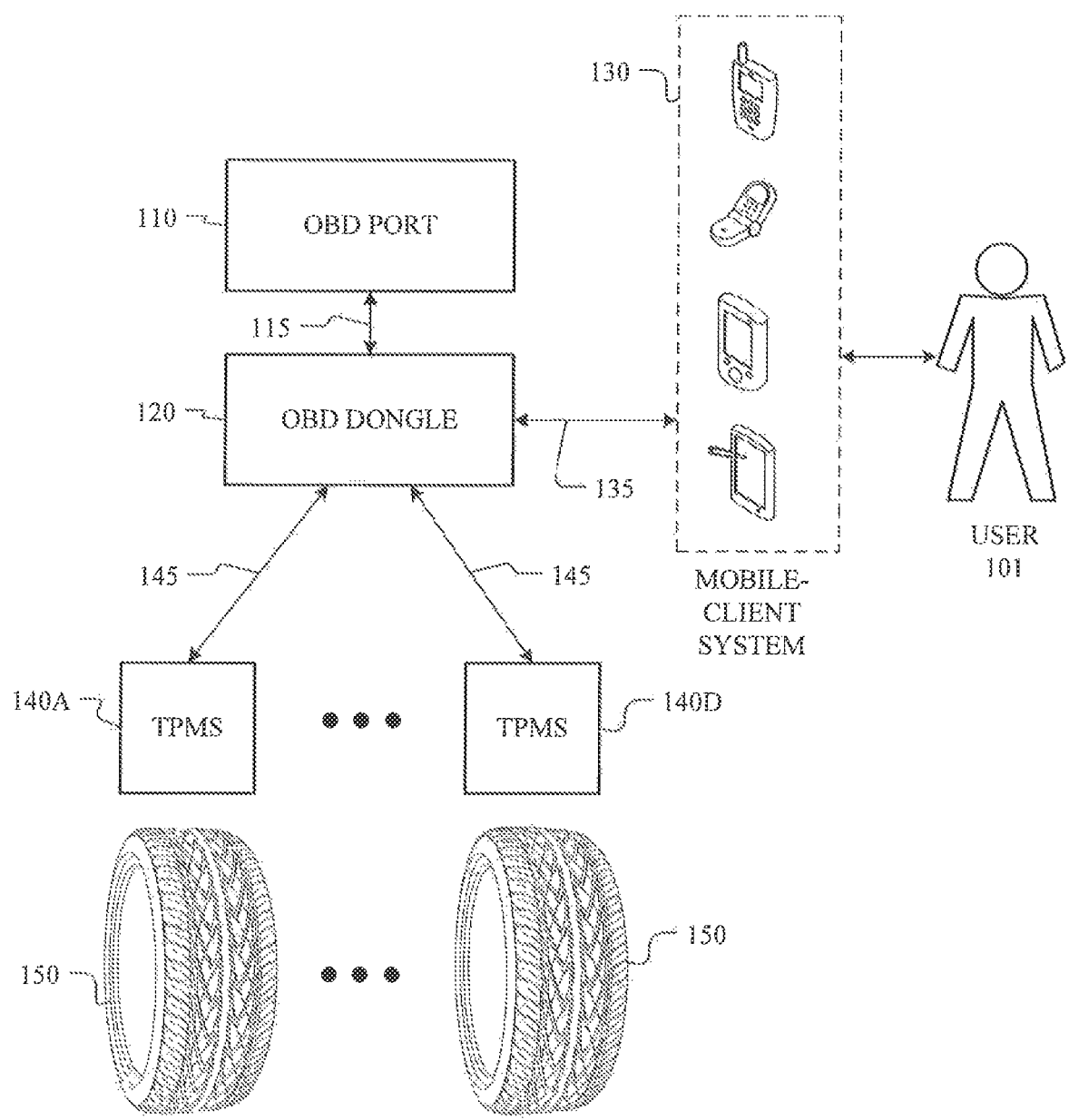
FIG. 1 illustrates an example system for providing tire monitoring for a vehicle, according to certain embodiments.

Tires are one of the most important components of automobiles, trucks, motorcycles, and other vehicles for many reasons. As one example, tires connect the mechanical power from the engine into acceleration and momentum. As another example, tires connect the mechanical compression of the brakes into stopping power. As yet another example, tires connect the mechanical movement of the rack and pinion into turning. In short, a vehicle's tires connect all movements of the vehicle to the road. As a result, tires are extremely important for the safety, drivability, enjoyability, reliability, efficiency, cost, comfort, and performance of a vehicle.

Having incorrect tires installed on a vehicle, or having tires that have been improperly inflated or maintained, will greatly affect how the vehicle performs. For example, having incorrect tires, bald tires, misaligned tires, or tires with incorrect pressure may adversely affect the safety, efficiency, drivability, performance, enjoyability, and comfort of the vehicle. In general, it is important to have the correct tires at the correct pressure and alignment installed on a vehicle for optimal and safe performance.

Manufacturers typically install standard, low-cost original equipment manufacturer (OEM) tires on cars when they are first offered for sale. Furthermore, the same type of tire is usually installed on every car regardless of what state, climate, or road conditions exist in the area. However, standard OEM tires may not be the optimal tire for a specific driver or area. For example, some drivers may have a more aggressive driving style that requires a higher-performance tire to accommodate their driving style. As another example, some areas may have poorer road conditions than normal (e.g., more potholes or more icy conditions) that require non-standard tires or tire pressures to ensure a safe and comfortable ride. In short, many variables come into play with regards to determining the "correct" tire for a vehicle. These variables may include the type of vehicle (year, make, model, etc.), the road conditions (wet, dry, icy, etc.), the weather conditions (raining, clear, etc.), and the driving behavior of the driver (sporty, conservative, etc.).

Most drivers typically only have their vehicle's tires inspected or replaced when it is either too late (e.g., after an accident or blowout) or during a required safety inspection (e.g., a yearly inspection). Furthermore, when drivers do replace tires, many do not go to a dealership to install the correct OEM tires for their specific vehicle, but rather seek to save money by purchasing tires at a discount provider. Tire recommendations from discount providers may be dependent on the employee who is working at the time, the driver's choice, or what is in stock at the time. This may result in the cheapest tires (e.g., the driver's choice) or the most expensive tires (e.g., the employee's choice) being chosen for a vehicle instead of the most appropriate tires for the driver and their specific situation.

In addition to the tire itself, it is also important that tires are optimally maintained. For example, wheel alignments and tire pressure should be correctly maintained. Air pressure is typically the most difficult to maintain since air usually seeps out of tires at a very slow rate and may be affected by temperature changes. For example, if a tire has a healthy pressure in the summer time when the temperature is high, the pressure may drop to an unhealthy pressure due to a temperature drop (e.g., over time due to changing seasons or rapidly due to changing weather). This may cause tire pressures to drop below the threshold of safe driving standards.

To address these and other issues associated with a vehicle's tires, embodiments of the disclosure provide systems and methods for monitoring a vehicle, its tires, the driving environment, and a vehicle's typical trip profile in order to provide recommended actions for the driver to take regarding their tires. The actions may include choosing the proper tires according to the driver's commute, geographic location, and driving style, and suggesting maintenance actions (e.g., changing tire pressure) to increase the life of the tires and safety of the vehicle. The following describes systems and methods for providing these and other desired features.

In general, embodiments of the disclosure provide systems and methods for monitoring a vehicle, its tires, the driving environment, and a vehicle's typical trip profile in order to recommend tires to use on the vehicle and maintenance actions to perform on the tires. For example, certain embodiments monitor a driver and a vehicle in order to determine the driver's driving habits (e.g., sporty, conservative, etc.), road conditions (e.g., full of potholes, etc.), commute route, and the like in order to recommend specific tires to purchase and install on the vehicle. In some embodiments, the local weather conditions (e.g., temperatures, forecast, etc.) and the tire pressure of the tires may be monitored in order to recommend tire pressure adjustments for the tires. As a result of these and other features of the disclosed embodiments, the driver may experience many added values such as increased tire life, increased safety, increased performance of the vehicle, increased comfort, and increased fuel efficiency. These and other benefits will be discussed in more detail below in reference to the included figures.

FIG. 1 illustrates an example system 100 for providing tire monitoring for a vehicle, according to certain embodiments. In some embodiments, system 100 includes an on-board diagnostic (OBD) port 110 of a vehicle, an OBD dongle 120, a client system 130, and one or more TPMS sensors 140 (e.g., 140A-D). Each TMPS sensor 140 is associated with (and may be included inside or coupled to) a respective tire 150 of the vehicle. In some embodiments, OBD dongle 120 is configured to be physically coupled to OBD port 110 and communicates (e.g., wirelessly or via a wired connection) with client system 130 and TPMS sensors 140. OBD dongle 120 receives OBD data 115 from OBD port 110 and TPMS data 145 from TPMS sensors 140 and communicates recommendation data 135 to client system 130. While a particular number of TPMS sensors 140 and tires 150 are illustrated in FIG. 1, other embodiments may have any other number of TPMS sensors 140 and tires 150. In addition, other embodiments may include any other appropriate systems or devices (e.g., repeaters for TPMS sensors 140, etc.).

In general, system 100 analyzes multiple inputs and parameters in order to recommend optimal tires to be installed on a particular vehicle as well as various maintenance actions to perform on the tires (e.g., tire pressure adjustments). These parameters relate to the vehicle, the driver, the environment in which the vehicle is operated, and the vehicle's typical trip profile. First, system 100 may analyze parameters of a particular vehicle in order to provide recommendations regarding the tires of the vehicle. These parameters may include the vehicle's standard wheel and tire dimensions, and its tire speed-rating requirements. In some embodiments, system 100 may access publicly-available databases to obtain this information. Such databases return the vehicle parameters by looking up the queried vehicle's Vehicle Identification Number (VIN). OBD dongle 120 may access the vehicle's VIN via OBD port 110. OBD dongle 120 may query, store, and transmit this VIN data to a remote processing entity to aid in tire selection.

Second, system 100 may analyze parameters related to vehicle driver's operating tendencies and driving habits in order to provide recommendations regarding the tires of the vehicle. In general, the vehicle driver's operating tendencies and driving habits greatly influence how the tires on their vehicle are used, worn, and stressed. For example, an aggressive driver who regularly brakes, accelerates, or turns abruptly may require a more grippy and responsive tire with forgiving and predictable behavior at its handling limits. Such a tire may ride more roughly and wear more quickly than other tires, but nonetheless would provide a safer and more appropriate tire selection for an aggressive driver. As explained in more detail below, system 100 may identify and quantify aggressive drivers using a number of methods. For example, accelerometers may be used to monitor excessive or abrupt changes in (i-forces to identify aggressive driving events. As another example, system 100 may use the rate of change in a vehicle's speed (e.g., using information from OBD port 110 or GPS-derived speed) to identify aggressive driving events.

Third, system 100 may analyze parameters related a vehicle's environment in order to provide recommendations regarding the tires of the vehicle. In general, the environment in which the vehicle is operated greatly affects which tire characteristics are most favorable for safety and performance. A tire's operating environment may include factors such as outside air temperature, the presence of water or snow on the road, wind velocity and vector, traffic density, type of road surface (e.g., concrete, asphalt, gravel, dirt, etc.), road condition (e.g., the road's International Roughness Index (IRI) score), road-type (e.g., winding mountain road, multilane interstate highway, city street, etc.), roadway prevailing speeds, and roadway elevation changes. Most or all of these environmental variables may be obtained by system 100 directly from the vehicle (e.g., via onboard sensors in OBD dongle 120 or client system 130 or via OBD port 110), or by using this information in combination with other available data. For example, outside air temperature (OAT) may be read directly from the vehicle using information available from OBD port 110. In some embodiments, in-vehicle accelerometers (e.g., accelerometer 240) may be used to estimate road conditions. In some embodiments, GPS location data may be used in combination with available weather services, traffic services, roadway databases, mapping services, and other data sources to determine current and historical environmental conditions experienced for any given vehicle.

In general, tire manufacturers generally classify their tires as 'Summer', 'All Season', 'Winter/Snow'. 'Off-Road', 'Trailer', or 'Competition' tires. Tires within each classification are generally designed for optimal performance under a very specific range of conditions and are known to perform very poorly, or potentially fail, under different conditions. For example, a high-performance 'Summer' tire is designed to provide exceptional performance on a warm dry road. However, such a tire should not be used in near-freezing temperatures, in snow, or on ice because the compounds used in these tires become very slippery when used in temperatures below a certain temperature (e.g., 40 degrees F.). This change is referred to as a "glass transition," and results from the tire's tread compound rubber properties changing from a pliable elastic to inflexible plastic at near-freezing temperatures. When operated near freezing, a high-performance summer tire will provide very little traction, is prone to suffer cracking, and may suffer irreparable loss of tread blocks. As a result, some embodiments of system 100 will take into account the vehicle's current environment, a historical range of environments, and forecast environment when recommending specific tires for a vehicle (e.g., if the temperature is about to drop, system 100 may recommend changing from 'Summer' tires to 'Winter/Snow' tires).

Fourth, system 100 may analyze parameters related a vehicle's typical trip profile in order to provide recommendations regarding the tires of the vehicle. For example, a driver who spends a significant portion of his driving time on long straight interstate highways at high speed will likely prefer a different tire than a driver who predominantly operates in a congested low-speed, stop-and-go environment. The highway driver will benefit from a tire that incorporates a sidewall that provides a softer ride, a tread design that generates less noise, and a harder tread compound that will wear more slowly and provide lower rolling-resistance (better fuel economy). Alternatively, the urban driver would instead benefit from a tire that incorporates a stiffer sidewall that provides more responsive handling, a tread design that maximizes all-weather braking and acceleration, and a softer tread compound that improves traction. As a result, some embodiments of system 100 will take into account a vehicle's typical trip profile when recommending specific tires for a vehicle.

User 101 is any person or entity that may benefit from the disclosed systems and methods of monitoring tires of a vehicle. For example, user 101 may be a driver of a vehicle. As another example, user 101 may be a mechanic or an employee at a vehicle service center (e.g., a tire shop), an insurance company, and the like.

OBD port 110 is any standard OBD port that is typically found in many vehicles such as cars and trucks. In some embodiments, OBD port 110 provides self-diagnostic and vehicle reporting capabilities. OBD port 110 provides access to the status of the various vehicle subsystems. In some embodiments, OBD port 110 is an OBD-II port. In some embodiments, OBD port 110 is physically coupled to OBD dongle 120 and provides power to OBD dongle 120. OBD port 110 communicates with OBD dongle 120 using any standard protocol typically utilized by OBD ports.

OBD data 115 is any data provided by OBD port 110 to OBD dongle 120. OBD data 115 may include vehicle diagnostic data (e.g., fault codes), vehicle performance data, engine performance data, or any other standard data available from a standard OBD port.

In general, OBD dongle 120 is a self-contained device for gathering information from a vehicle and providing recommendation data 135 to client system 130. In some embodiments, OBD dongle 120 includes circuitry for gathering data and communicating with OBD port 110, TPMS sensors 140, and client device 130. In some embodiments, recommendation data 135 is sent directly from OBD dongle 120 to client device 130 (e.g., via Bluetooth). In other embodiments, both OBD dongle 120 and client device 130 may be connected to a network (e.g., a Wi-Fi or cellular network) and recommendation data 135 is sent from OBD dongle 120 to client device 130 via the network. A particular embodiment of OBD dongle 120 is described in more detail below in reference to FIG. 2.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, dedicated display device, other suitable electronic device, or any suitable combination thereof. This disclosure contemplates any suitable client systems 130. A client system 130 may enable its user to communicate with other users at other client systems 130.

In particular embodiments, client system 130 may include a mobile application (e.g., an "app") and/or a web browser (e.g., MICROSOFT INTERNET EXPLORER, GOOGLE CHROME, MOZILLA FIREFOX, etc.) for viewing information related to recommendation data 135. For example, a mobile app on client device 130 may display the current health of tires 150, the current tire pressure of tires 150, remaining life of tires 150, recommended tires 150 to install, recommended tire maintenance items (e.g., tire pressure changes, rotations, alignments, etc.), and the like.

Recommendation data 135 is any data regarding recommendations for tires 150. For example, recommendation data 135 may include a recommended tire to be installed on a vehicle. As another example, recommendation data 135 may include recommended maintenance items for tires 150 (e.g., tire pressure changes, rotations, alignments, etc.). In some embodiments, data collected by OBD dongle 120 from OBD port 110 and TPMS sensors 140 (i.e., OBD data 115 and TPMS data 145) may be packaged as recommendation data 135 and transmitted to client device 130. Client device 130 may then use recommendation data 135 in order to recommend particular tires to install or a particular tire pressure to use on tires 150.

TPMS sensor 140 is any standard device to monitor the air pressure inside tires 150. In some embodiments, TPMS sensors 140 wirelessly report real-time TPMS data 145 to OBD dongle 120. In other embodiments, TPMS sensors 140 wirelessly send TPMS data 145 to another receiver device (e.g., in a wheel well) that in turn communicates TPMS data 145 to OBD dongle 120.

TPMS data 145 is any data collected and reported by TPMS sensors 140. In some embodiments, TPMS data 145 include one or more of the following: air pressure, temperature, rotational speed, battery life of the sensor, and a unique ID. The unique ID may be an identification of a particular tire of the vehicle (e.g., front right tire).

Figure 2:
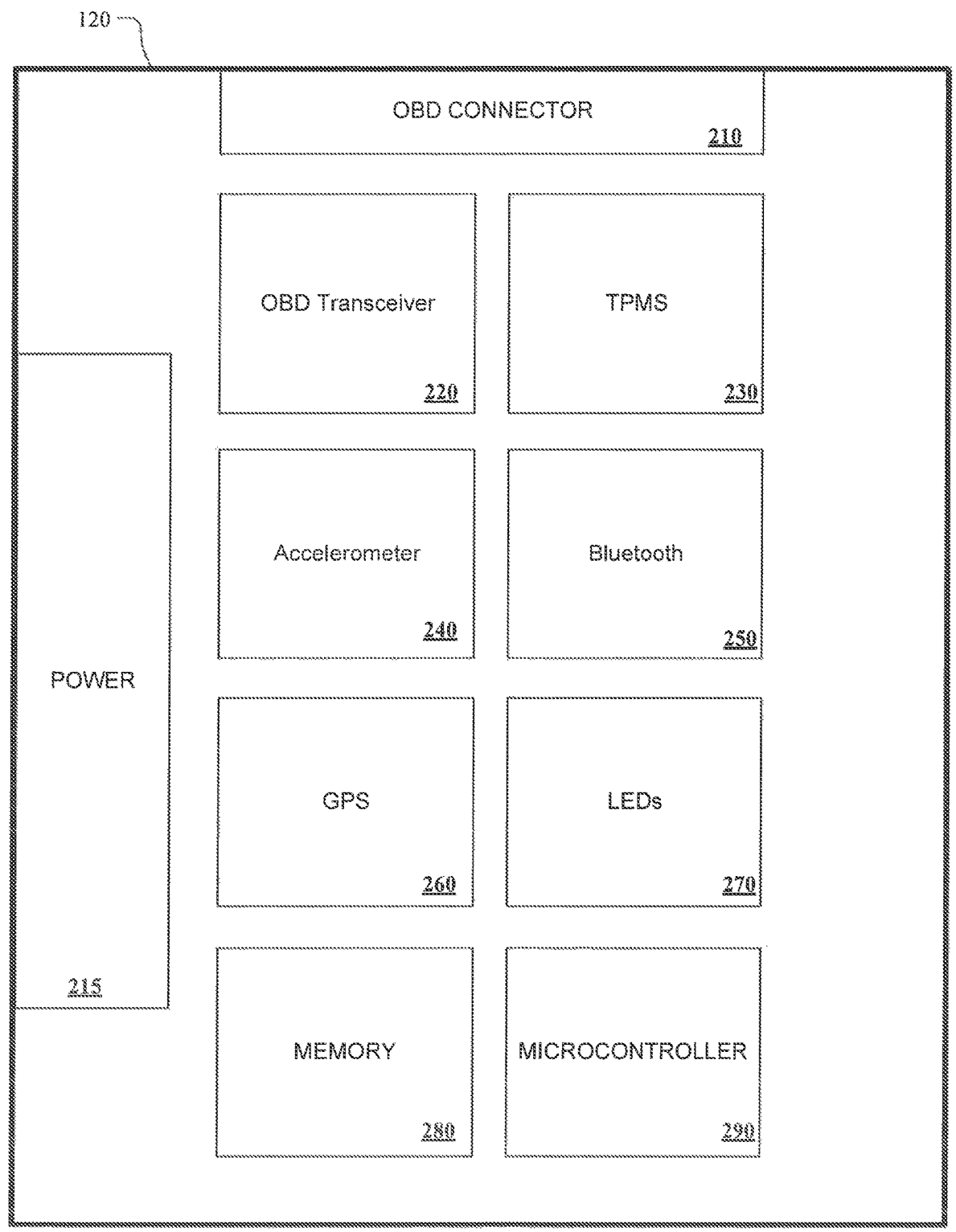
FIG. 2 illustrates an example system diagram of the OBD dongle of FIG. 1, according to certain embodiments.

FIG. 2 illustrates an example system diagram of OBD dongle 120 of FIG. 1, according to certain embodiments. In some embodiments, OBD dongle 120 includes an OBD connector 210, a power source 215, an OBD transceiver 220, a TPMS receiver 230, one or more accelerometers 240, a Bluetooth transceiver 250, a GPS transceiver 260, one or more LEDs 270, one or more memory devices 280, and a microcontroller 290. OBD dongle 120 may additionally include a microphone, a speaker, a Wi-Fi transceiver, and a cellular transceiver (not illustrated). While FIG. 2 illustrates certain components of OBD dongle 120, other embodiments of OBD dongle 120 may include any other appropriate components for providing the functionality described herein. In addition, while OBD dongle 120 is illustrated in FIG. 2 as including microcontroller 290, other embodiments many include a computer system such as computer system 300 described below or one or more microprocessors such as processor 302 described below.

In operation of example embodiments, OBD dongle 120 analyzes data from multiple sources in order to generate recommendation data 135 that is sent to client device 130. Recommendation data 135 may include recommendations on which particular tire should be installed on the vehicle and what tire pressure to use in tires 150. The input data may include OBD data 115 and TPMS data 145, which may include vehicle specifications, vehicle data, tire specifications, environmental conditions and personalized driving behaviors. For example, the input data may include the following vehicle specifications: year, make, model, style, engine size, horse power, torque, wheel size, and stock tire identification. As another example, the input data may include the following vehicle data: current miles, last service date, current speed, average speed, vehicle weight, and tire data (e.g., last tire service, current tire identification, current tire pressure, tread depth, etc.). As another example, the input data may include the following tire specifications: manufacturer, style, size, max pressure, recommended pressure, tread wear rating, speed rating, load rating, temp rating, consumer reviews, winter rating, rain rating, summer rating, directional/unidirectional, asymmetric/directional, and MSRP. As another example, the input data may include the following environment conditions: location (e.g., GPS coordinates), weather (e.g., historical, current and forecasted), street composites (e.g., concrete, asphalt, dirt, etc.), street conditions, traffic patterns, and speed limit. As another example, the input data may include the following driving behavior data: typical routes/stops, acceleration style, braking style, cornering style, and speeding style (e.g., relative to speed limit).

In choosing whether a tire is right for a vehicle, embodiments may gather data specific to a driver, to a vehicle, and to the location (e.g., using GPS). For the vehicle, the make, model, and style of the vehicle may be analyzed. Other factors such as the weight of the vehicle, engine size, horse power, torque, wheel size, stock tire, and any other vehicle data may be analyzed to chose the correct tire.

In some embodiments, live vehicle data is analyzed by system 100. For example, mileage, the tire last serviced, the current tire on the car, the current tire pressure, etc. may be analyzed. Tire tread depth may also be indicative of tire health (i.e. the tread depth of a tire). Tread depth is an accurate way of determining how much rubber is left on the tire and how much traction is left on the tire. Tire specifications (style of the tires, the size, max pressure, recommended pressure, tread wear ratings, speed ratings, road ratings, temp rating, winter rating, rain rating, separation rating, pattern, etc.) may also be used by system 100.

System 100 may select a tire based on a number of these factors in combination with how the vehicle is configured and the environmental conditions. Other factors may include location, weather, the forecast, street condition, traffic pattern, driving behavior, typical route, acceleration and stop, acceleration style, braking style, coming style, speeding style relative to the speed limit, and the like. In some embodiments, system 100 may analyze how a driver drives, what they drive, where they drive, and personal preferences (e.g., sportier tires, budget-friendly tires, longer-life tires, etc.) may be used. Some or all of these may be taken into consideration in choosing a tire to recommend.

Tire pressure may also be monitored by system 100. The pounds per square inch (psi) pressure number located on a tire's sidewall identifies the maximum cold inflation pressure that the tire is rated to hold. System 100 may obtain this information from any appropriate data source such as a database. However, the tire's maximum pressure is not necessarily the correct pressure for every vehicle. Furthermore, tire pressure may change drastically depending on weather patterns. In general, tire pressure affects ride comfort and performance of the tire. If a tire's pressure is too high, then the middle of the tire will be crowned and the outsides will not make sufficient contact with the road. This results in uneven wear, smaller contact, and decreased performance. If a tire's pressure is too low, the outsides of the tire will make more contact with the road than the middle. This also results in uneven wear, smaller contact, and decreased performance. For the best performance, tires should have the most surface contact with the road, which is the result of having an optimal/correct tire pressure.

A driver's commute or driving patterns may also affect their vehicle's tires. The amount of driving (e.g., mileage) affects the tire pressure as well as how often the tires need to be serviced. System 100 helps drivers not only understand when they need to get their tires serviced, it also equips the businesses to easily service the customers. This benefits not just the tire centers, but also the insurance companies and other retailers that would benefit from the increase in client face time and interaction.

In some embodiments, system 100 utilizes signals from TPMS sensors 140 in order to provide deeper intelligence to the driver. System 100 may combine TPMS data 145 with some or all of the other data discussed herein in order to inform the driver what their tire pressure is, what their tire health is, and recommended actions. For example, system 100 may receive TPMS data 145 from a particular TPMS sensor 140 that indicates that the tire is currently 5% under-inflated (i.e., is 5% under the recommended pressure for the particular tire). In some embodiments, system 100 may include the tire's inflation data in recommendation data 135. System 100 may then display to the driver that a certain amount of air should be added to the tire. As another example, system 100 may combine TPMS data 145 with current or future weather conditions to recommend maintenance actions for tires 150. For example, if one or more tires are currently inflated to the proper pressure, but the weather forecast indicates that the temperature will be dropping a certain amount over the upcoming hours or days, system 100 may display to the driver that a certain amount of air will need to added to the tire in the near future.

For driving behavior, system 100 may utilize the accelerometer of OBD dongle 120. For example, data from the accelerometer of OBD dongle 120 may indicate acceleration, stopping, and maneuvering habits of a particular driver or vehicle. This data may be compared to a database of known driving habits of the general population. If the data is a certain percentage above the average according to the database of the general population, system 100 may determine that the particular driver's driving style is sporty/aggressive. If the data is a certain percentage below the average according to the database of the general population, system 100 may determine that the particular driver's driving style is conservative. In some embodiments, system 100 may also use vehicle speed, throttle position, throttle percentage, brake percentage, wheel speed, wheel angle, and the like to analyze driving behavior. Some of this data may be received directly from OBD data 115.

In some embodiments, system 100 may obtain accelerometer data, GPS data, etc. from client device 130. For example, client device 130 may include one or more gyroscopes, accelerometers, and GPS transceivers. In some embodiments, client device 130 may be running an application that communicates this and other data to OBD dongle 120.

Temperature may also be analyzed by system 100 and then used for making tire recommendations. Temperature is one of the most important factors for tires because temperature can greatly affect tire pressure. In general, tires have a cold pressure and a hot pressure. These pressures can vary greatly based on the weight of the vehicle, the styles of the tires, and the air volume they hold. System 100 may determine a current temperature or an average temperature for a given location and use the determined information to recommend a specific type of tire or adjustments to tire pressures. For example, if system 100 determines that a vehicle is being operated in a desert climate, it may recommend certain tires that are specifically designed for higher temperatures. As another example, if system 100 determines that the average temperature over the a certain time period (e.g., two days) has dropped or increased by a certain amount or percentage, system 100 may recommend adjusting tire pressures accordingly.

In some embodiments, system 100 may use accelerometers 240 and GPS 260 within OBD dongle 120 or client device 130 to map street conditions. For example, if certain streets being driven for a commute are potholed, system 100 can detect the bad conditions because OBD dongle 120 will be moving and vibrating along with the vehicle as it travels the streets. In some embodiments, system 100 may map out the street conditions of a driver's daily commute (e.g., routes and the street conditions). If a driver installs a very soft tire on their vehicle because they want performance, yet they are commuting on a very rough road, the overall condition of the tires may be affected. System 100 may determine the history of the conditions. The street conditions, the driving patterns, and the route may all affect the target tire pressure because it depends on how much tires 150 are heated. So, as an example, consider a scenario where a driver has as long commute. In this case, system 100 may recommend a lower cold tire pressure so that by the time the tires heat up, the majority of the trip will be at the tires' optimal tire pressure. For shorter commutes, system 100 may recommend a higher cold tire pressure so that the tires will arrive at the optimal tire pressure quicker and the majority of the trip will be at the tires' optimal tire pressure. These and other conditions that may be analyzed by system 100 to make tire recommendations are discussed in more details below.

In some embodiments, system 100 determines a driver's driving habits (e.g., sporty, conservative, etc.) in order to recommend specific tires to purchase and install on the vehicle. For example, system 100 may analyze data from accelerometers 240 or GPS 260 within OBD dongle 120 or client device 130 to determine a driver's acceleration, braking, cruising, and turning habits. If the speed of the driver's acceleration, braking, cruising, or turning habits meets or exceeds a certain threshold (e.g., the driver's average speed is 10% greater than the posted speed limit), then system 100 may determine that the driver's style is sporty. If, on the other hand, the speed of the driver's acceleration, braking, cruising, or turning habits are less than a certain threshold (e.g., the driver's acceleration and braking habits are 10% less than an average of the population as a whole), then system 100 may determine that the driver's style is conservative. System 100 may then recommend certain tire styles or types based on the determined driving habits of the driver. For example, if system 100 determines that the driver is a sporty driver, system 100 may recommend tires designed for more performance (e.g., softer tires).

In some embodiments, system 100 determines road conditions of a commute route in order to recommend specific tires to purchase and install on the vehicle. For example, system 100 may analyze data from GPS 260 within OBD dongle 120 or client device 130 to determine that a driver takes a specific route (i.e., one or more specific roads) a predetermined number of days per week (e.g., five days per week). System 100 may then cross-reference a database of known road conditions to determine the condition of each road traveled on the commute. The database may indicate, for example, the type of material for the road (e.g., asphalt, dirt, etc.) and the condition of the road (e.g., poor, fair, good, or excellent). If system 100 determines that a particular driver's commute has many poorly-maintained roads (e.g., roads that contain a certain number of potholes, roads that are a certain percentage rougher than an average road, or roads with a "poor" rating), it may recommend a different tire than for smooth roads. For example, system 100 may recommend a softer tire and/or a lower tire pressure in order to deliver a smoother, more comfortable commute. For smoother roads, system 100 may recommend stiffer tires and/or more tire pressure.

In some embodiments, the local weather conditions (e.g., temperatures, forecast, etc.) and the tire pressure of the tires may be monitored in order to recommend tire pressure adjustments for the tires. In one example, if system 100 determines via a weather forecast that the outdoor temperature is about to decrease a certain amount, system 100 may recommend pressure be proactively added to tires 150. As another example, if system 100 determines via a weather forecast that the outdoor temperature is about to increase a certain amount, system 100 may recommend pressure be proactively removed from tires 150. In some embodiments, the local weather conditions may be monitored in order to recommend tire changes. For example, some high performance tires (e.g., summer tires) may become very brittle in certain temperatures and thus may loose traction. System 100 may detect this and recommend that the driver change out the tires if the temperature drops or is about to drop (e.g., winter is coming).

In some embodiments, system 100 may consult one or more tire databases to determine parameters associated with tires. For example, the U.S. Department of Transportation (DOT) National Highway Traffic Safety Administration's (NHTSA) created the Uniform Tire Quality Grade Standards (UTQG) in 1979 for providing standardized measurements of a given tire's treadwear, traction, and temperature handling performance. Additionally, tire manufacturers, tire distributors, and tire retailers generally provide tire testing performance data for most tire models available. Furthermore, third-parties such as Tire Rack, Inc. provides performance ratings for thousands of tires on their website. Their rating system uses a 10-point scale to rate a tires performance across 5 categories; Wet Performance (Hydroplaning resistance, wet traction), Dry Performance (cornering stability, dry traction, steering response), Comfort (Ride Quality, Noise), and Treadwear performance. These and other sources of tire information may be accessed and used by system 100 in recommending tires for a vehicle, as described above.

In general, system 100 takes the guess work out of tire pressure and tire selection and provides recommendations based on some or all of the factors discussed herein. For example, system 100 may recommend a certain tire pressure for current conditions but another recommendation when seasons/weather changes (e.g., "you should add four pounds of pressure because it is about to get cooler"). It may also recommend tire rotations based on the amount of time/mileage since the last rotation (e.g., as determined from GPS) and, depending on location and date, seasonal tires (e.g., winter tires). These recommended tire changes may be summarized and displayed to the driver to allow one trip to a recommended business to implement the changes (e.g., install the winter tires, store summer tires, set an optimal tire pressure based on driving, etc.).

In some embodiments, the gas inside the tires may be determined and factored into any tire recommendations. For example, if system 100 determines that normal air is being used to inflate tires 150, it may recommend tire pressure adjustments based on temperature. On the other hand, if system 100 determines that another gas such as nitrogen is being used to inflate tires 150, it may recommend fewer or no pressure adjustments based on temperature. System 100 may determine the gas used to inflate tires 150 using any appropriate sensor or indication from the driver (e.g., by the driver selecting a user-selectable option on system 100 or client device 130).

In some embodiments, OBD data 115 may include shock absorber data. This data may provide information about the road conditions (e.g., if it is smooth or rough). This may then be used by system 100 in forming tire recommendations for a driver, as discussed above. For example, if the shock absorber data indicates that a driver has a rough daily commute, system 100 may recommend that appropriate tires for rough roads be installed on the vehicle.

In some embodiments, OBD dongle 120 may communicate with an external laser system to determine the tread wear of tires 150. For example, some service centers are equipped with laser scanning systems that scan customer's tires as they enter a service bay. OBD dongle 120 may communicate with such systems in order to obtain data about the tread wear of tires 150. This data may then be used by OBD dongle 120 to make tire recommendations to the driver. For example, if OBD dongle 120 determines that a tire has less than a certain amount of tread left, system 100 may recommend that the tire be replaced. In some embodiments, the determined tread wear of each tire 150 may be displayed on, for example, client system 130.

In some embodiments, OBD dongle 120 may obtain the vehicle's VIN from OBD data 115 and correlate the VIN to the unique identifiers of TPMS sensors 140. This information may then be transmitted to client device 130. This may be useful in tying specific tires to a specific vehicle.

In some embodiments, OBD dongle 120 may include the ability to communicate with garage door openers. In some embodiments, OBD dongle 120 may sense that a garage door has been opened and in response may use Wi-Fi to turn on lights in the driver's house. In some embodiments, OBD dongle 120 may utilize data from GPS 260 within OBD dongle 120 or client device 130 to determine that the vehicle is in its driveway and in response may automatically send a signal to open the garage door.

In some embodiments, OBD dongle 120 may wirelessly communicate with another device that replicates OBD port 110. The other device may, for example, be plugged into a cigarette lighter for power and may include its own OBD connector in which other devices may connect. OBD dongle 120, because it is plugged into OBD port 110, may wirelessly send and receive signals to the other device in order to replicate OBD port 110.

In some embodiments, OBD dongle 120 may be utilized for two-step authentication of a vehicle. Some cars today provide drivers with the ability to simply approach the car with a key fob in order to unlock the doors, start the car, and drive away. While this is convenient for drivers, it enables thieves to easily steal cars by simply stealing the key fob. Two-step authentication by system 100, however, makes it much more difficult for thieves to steal cars. For example, OBD dongle 120 may include one or more microphones to detect sounds within the car and its surroundings. A driver with a key fob could walk up to the car and perform an action as simple as tapping on the window a certain amount of times (e.g., five times) or in a certain pattern in order to unlock the car. The key fob could be detected by the car (i.e., the first step) and the tapping could be detected and verified by OBD dongle 120 (i.e., the second step). If both steps are verified, system 100 may send one or more instructions to unlock the doors of the vehicle and/or start the vehicle. In some embodiments, one or more microphones in OBD dongle 120 may be used to detect glass breakage. This may be used to detect break-ins and crashes and then automatically alert authorities (e.g., police, ambulances, etc.). As another example, the mere proximity of a known mobile device could be used as the second authentication step. Identification could be performed by OBD dongle 120 via detection of a known unique device address or identifier of the mobile device (e.g., a MAC address) or by communicating with an installed app on the mobile device (e.g., via Bluetooth or Wi-Fi).

Figure 3:
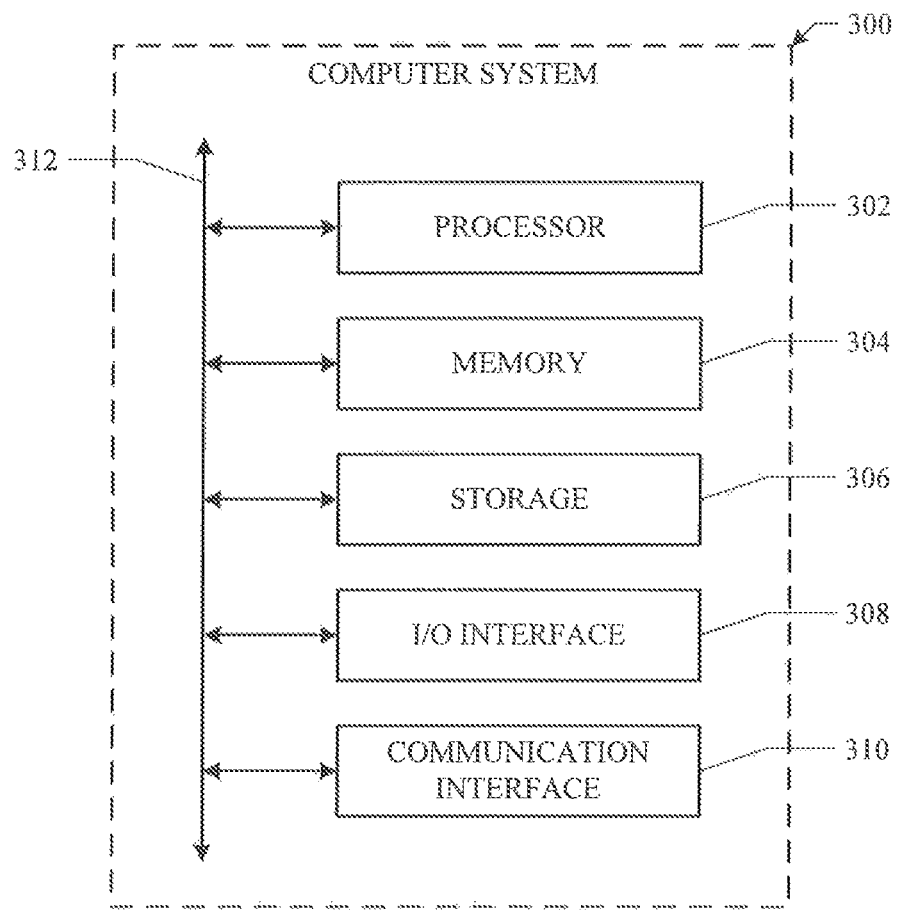
FIG. 3 illustrates an example computer system that may be used by certain embodiments.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Figure 4:
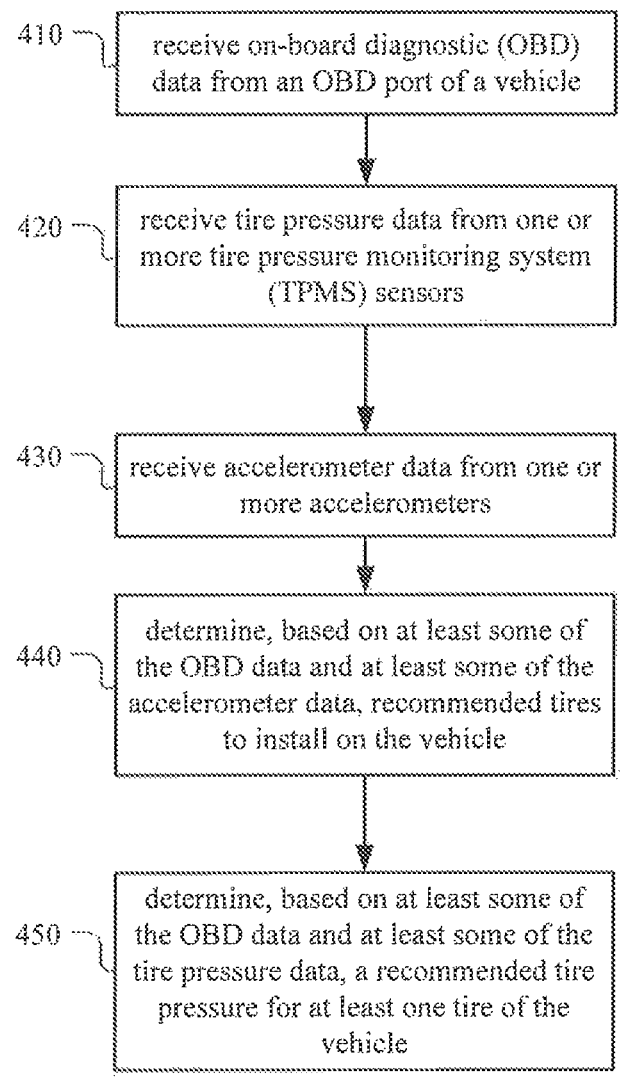
FIG. 4 illustrates an example method for providing tire recommendations for a vehicle, according to certain embodiments.

FIG. 4 illustrates an example method 400 for providing tire recommendations for a vehicle. Method 400 may begin at step 410, where OBD data from an OBD port of a vehicle is received. In some embodiments, the OBD data is OBD data 115. In some embodiments, the OBD port is OBD port 110. In some embodiments, the OBD data is received by OBD dongle 120 or client system 130.

At step 420, method 400 receives tire pressure data from one or more TPMS sensors. In some embodiments, the tire pressure data is TPMS data 145. In some embodiments, the TPMS sensors are TMPS sensor 140. In some embodiments, the tire pressure data is received by OBD dongle 120 or client system 130.

At step 430, method 400 receives accelerometer data from one or more accelerometers. In some embodiments, the one or more accelerometers are accelerometers 240. In some embodiments, the accelerometers are within OBD dongle 120 or client system 130. In some embodiments, the accelerometer data is received by OBD dongle 120 or client system 130.

At step 440, method 400 determines, based on at least some of the OBD data of step 410 and at least some of the accelerometer data of step 430, recommended tires to install on the vehicle. In some embodiments, this step may include accessing a database of available tires and then filtering tires from the database using the OBD data. For example, the available tires may be filtered according to required tire size and speed rating for the particular vehicle, as derived from vehicle VIN in the OBD data. In some embodiments, this step may include filtering out tires from the database using current, historical, and/or prior environmental temperature data pertaining to the vehicle as derived from the OBD data. For example, if the vehicle is operated mainly in desert conditions, all winter tires may be filtered out from consideration. In some embodiments, the remaining tires in the database (e.g., after applying appropriate filters) are ranked or weighted based upon the percentage of time and/or miles driven under a combination of available driver, environmental, and trip profile parameters, and/or the predominance of certain parameters. In some embodiments, the following example performance categories are weighted for each remaining tire: wet performance (e.g., hydroplaning resistance, wet traction), dry performance (e.g., cornering stability, dry traction, steering response), comfort (e.g., ride quality, noise), and treadwear performance. In some embodiments, a list of optimal tires for the particular vehicle is then determine by utilizing the weighted data provided above and available tire performance data.

In some embodiments, available tire and/or fuel pricing data from a database may be used to further refine the tire selection process of step 440. For example, if two tires otherwise perform similarly, but one tire offers a greater treadwear rating or lower rolling resistance, the relative price of the tires could be compared against projected additional tire life and/or fuel savings to calculate the expected expense differential on a per mile basis. Method 400 may then use this information to improve a tire's overall rank in the selection process.

At step 450, method 400 determines, based on at least some of the OBD data of step 410 and at least some of the tire pressure data of step 420, a recommended tire pressure for at least one tire of the vehicle. In some embodiments, this step may include comparing the tire pressure data to a manufacturer's recommended tire pressure. In some embodiments, the OBD data may be analyzed to determine a driver's driving habits (e.g., sporty or conservative). In some embodiments, the OBD data may be analyzed to determine a driver's commute. In some embodiments, the OBD data may be analyzed to determine current or future weather conditions. A recommended tire pressure for at least one of the tires may then be displayed to the driver. For example, if the OBD data indicates that the driver has a long commute, method 400 may recommend a lower cold tire pressure that what is indicated by the current tire pressure data so that by the time the tires heat up, the majority of the trip will be at the tires' optimal tire pressure. As another example, if the OBD data indicates that the weather is about to change, method 400 may recommend adjusting the current tire pressure accordingly (e.g., raise the tire pressure if the weather is about to turn colder).

At step 460, method 400 sends information to display the recommended tires to install on the vehicle of step 440 and the recommended tire pressure of step 450 on a display device. In some embodiments, the display device is coupled to OBD dongle 120. In some embodiments, the display device is client system 130. For example, the information may be sent to an app running on client system 130.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for providing tire recommendations for a vehicle including the particular steps of the method of FIG. 4, this disclosure contemplates any suitable method for providing tire recommendations for a vehicle including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, references to actions performed by system 100 may include one or more actions by one or more components of system 100. For example, actions by system 100 may include actions performed by OBD dongle 120, client system 130, or a combination of both of these components.

Herein, "vehicle" encompasses any appropriate means of transportation that user 101 may own and/or use that utilizes tires. For example, "vehicle" includes, but is not limited to, any ground-based vehicle such as an automobile, a motorcycle, an RV, an all terrain vehicle (ATV), a golf cart, a tractor, a truck, construction equipment, and the like. "Vehicle" also includes, but is not limited to, any air-based vehicle such as an airplane, a helicopter, and the like.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system comprising:
   one or more accelerometers;
   one or more processors; and
   a memory communicatively coupled to the one or more processors, the memory comprising instructions executable by the one or more processors, the one or more processors, being operable when executing the instructions to:

receive on-board diagnostic (OBD) data from an OBD port of a vehicle;
receive tire pressure data from one or more tire pressure monitoring system (TPMS) sensors;
receive accelerometer data from the one or more accelerometers;
determine a daily commute of a driver;
determine, using the accelerometer data, road conditions along the daily commute of the driver;
determine, based on at least some of the OBD data and at least some of the accelerometer data, recommended tires to install on the vehicle;
determine, based on the determined daily commute of the driver, at least some of the OBD data, the road conditions along the daily commute of the driver, and at least some of the tire pressure data, a recommended cold tire pressure for at least one tire of the vehicle; and
send information to display the recommended tires to install on the vehicle and the recommended cold tire pressure on a display device.

2. The system of claim 1, wherein the OBD data comprises one or more of:
a Vehicle Identification Number (VIN);
a year in which the vehicle was built;
a make of the vehicle;
a model of the vehicle;
an amount of mileage of the vehicle;
diagnostic data of the vehicle; and
performance data of the vehicle.

3. The system of claim 1, wherein the tire pressure data comprises one more of:
current tire pressure;
current temperature;
current rotational tire speed;
battery life; and
a unique ID.

4. The system of claim 1, wherein the vehicle comprises:
an automobile;
a motorcycle;
a recreational vehicle (RV);
an all terrain vehicle (ATV);
a golf cart;
an airplane;
a construction vehicle;
a tractor; or
a truck.

5. The system of claim 1, the one or more processors being further operable when executing the instructions to determine weather data associated with the vehicle, wherein the recommended cold tire pressure and the recommended tires are further determined based on the weather data.

6. The system of claim 1, further comprising a microphone, wherein the one or more processors are further operable when executing the instructions to:
detect, using the microphone, one or more sounds associated with the driver performing a security verification action;
determine whether the security verification action of the (river matches a stored security protocol; and
in response to determining that the security verification action matches a stored security protocol, sending one or more instructions to the vehicle to unlock a door of the vehicle;
wherein the security verification action comprises:
the driver knocking or tapping on the vehicle a certain amount of times; or
the driver knocking or tapping on the vehicle in a certain pattern.

7. A method comprising:
receiving, by a computing device, on-board diagnostic (OBD) data from an OBD port of a vehicle;
receiving, by the computing device, tire pressure data from one or more tire pressure monitoring system (TPMS) sensors;
receiving, by the computing, device, accelerometer data from one or more accelerometers;
determining a daily commute of a driver;
determining, using the accelerometer data, road conditions along the daily commute of the driver;
determining, by the computing device based on at least some of the OBD data and at least some of the accelerometer data, recommended tires to install on the vehicle;
determining, by the computing device based on the determined daily commute of the driver, at least some of the OBD data, the road conditions along the daily commute of the driver, and at least some of the tire pressure data, a recommended cold tire pressure for at least one tire of the vehicle; and
sending, by the computing device, information to display the recommended tires to install on the vehicle and the recommended cold tire pressure on a display device.

8. The method of claim 7, wherein the OBD data comprises one or more of:
a Vehicle Identification Number (VIM);
a year in which the vehicle was built;
a make of the vehicle;
a model of the vehicle;
an amount mileage of the vehicle;
diagnostic data of the vehicle; and
performance data of the vehicle.

9. The method of claim 7, wherein the tire pressure data comprises one or more of:
current tire pressure;
current temperature;
current rotational tire speed;
battery life; and
a unique ID.

10. The method of claim 7, wherein the vehicle comprises:
an automobile;
a motorcycle;
a recreational vehicle (RV);
an all terrain vehicle (ATV);
a golf cart;
an airplane;
a construction vehicle;
a tractor; or
a truck.

11. The method of claim 7, further comprising determining, by the computing device, weather data associated with the vehicle, wherein the recommended cold tire pressure and the recommended tires are further determined based on the weather data.

12. The method of claim 7, further comprising:
detecting, by the computing device using a microphone, one or more sounds associated with the driver performing a security verification action;
determining, by the computing device, whether the security verification action of the driver matches a stored security protocol; and
in response to determining that the security verification action matches a stored security protocol, sending, by the computing device, one or more instructions to the vehicle to unlock a door of the vehicle;

wherein the security verification action comprises:
the driver knocking or tapping on the vehicle a certain amount of times; or
the driver knocking or tapping on the vehicle in a certain pattern.

13. One or more computer-readable non-transitory storage media embodying software that is operable when executed to:
receive on-board diagnostic (OBD) data from an OBD port of a vehicle;
receive tire pressure data from one or more tire pressure monitoring system (TPMS) sensors;
receive accelerometer data from the one or more accelerometers;
determine a daily commute of a driver;
determine, using the accelerometer data, road conditions along the daily commute of the driver;
determine, based on at least some of the OBD data and at least some of the accelerometer data, recommended tires to install on the vehicle;
determine, based on the determined daily commute of the driver, at least some of the OBD data, the road conditions along the daily commute of the driver, and at least some of the tire pressure data, a recommended cold tire pressure for at least one tire of the vehicle; and
send information to display the recommended tires to install on the vehicle and the recommended cold tire pressure on a display device.

14. The media of claim 13, wherein the OBD data comprises one or more of:
a Vehicle Identification Number (VIN);
a year in which the vehicle was built;
a make of the vehicle;
a model of the vehicle;
an amount of mileage of the vehicle;
diagnostic data of the vehicle; and
performance data of the vehicle.

15. The media of claim 13, wherein the tire pressure data comprises one or more of:
current tire pressure;
current temperature;
current rotational tire speed;
battery life; and
a unique ID.

16. The media of claim 13, wherein the software is further operable when executed to determine weather data associated with the vehicle, wherein the recommended cold tire pressure and the recommended tires are further determined based on the weather data.

17. The media of claim 13, wherein the software is further operable when executed to:
detect, using a microphone, one or more sounds associated with the driver performing a security verification action;
determine whether the security verification action of the driver matches a stored security protocol; and
in response to determining that the security verification action matches a stored security protocol, sending one or more instructions to the vehicle to unlock a door of the vehicle;
wherein the security verification action comprises:
the driver knocking or tapping on the vehicle a certain amount of times; or
the driver knocking or tapping on the vehicle in a certain pattern.

* * * * *